(12) United States Patent
Nicholson et al.

(10) Patent No.: US 10,847,163 B2
(45) Date of Patent: Nov. 24, 2020

(54) PROVIDE OUTPUT REPONSIVE TO PROXIMATE USER INPUT

(71) Applicant: Lenovo (Singapore) Pte. Ltd., Singapore (SG)

(72) Inventors: John Weldon Nicholson, Cary, NC (US); Daryl Cromer, Cary, NC (US); Ming Qian, Cary, NC (US); David Alexander Schwarz, Morrisville, NC (US); Lincoln Penn Hancock, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/628,173

(22) Filed: Jun. 20, 2017

(65) Prior Publication Data
US 2018/0366126 A1    Dec. 20, 2018

(51) Int. Cl.
| | | |
|---|---|---|
| *G10L 17/06* | (2013.01) | |
| *G10L 15/22* | (2006.01) | |
| *G10L 17/22* | (2013.01) | |
| *G01J 5/12* | (2006.01) | |
| *H04N 5/30* | (2006.01) | |
| *G01J 5/00* | (2006.01) | |

(52) U.S. Cl.
CPC .............. *G10L 17/06* (2013.01); *G10L 15/22* (2013.01); *G10L 17/22* (2013.01); *G01J 5/0025* (2013.01); *G01J 5/12* (2013.01); *G10L 2015/226* (2013.01); *H04N 5/30* (2013.01)

(58) Field of Classification Search
CPC ...... H04W 84/18; G10L 15/265; H04H 60/04
See application file for complete search history.

(56) References Cited

U.S. PATENT DOCUMENTS

| | | | | |
|---|---|---|---|---|
| 6,144,938 A * | 11/2000 | Surace | .................. | G10L 13/033 704/257 |
| 6,757,362 B1 * | 6/2004 | Cooper | ................. | H04M 3/527 379/88.01 |
| 8,243,961 B1 * | 8/2012 | Morrill | ............... | H04M 1/6041 379/433.03 |
| 8,660,849 B2 * | 2/2014 | Gruber | ................ | G10L 15/1815 704/275 |
| 8,807,131 B1 * | 8/2014 | Tunnell | ............. | A61M 16/0051 128/200.14 |
| 8,997,226 B1 * | 3/2015 | Call | ...................... | G06F 21/552 726/22 |
| 9,554,091 B1 * | 1/2017 | Malegaonkar | ......... | H04N 7/152 |
| 9,728,188 B1 * | 8/2017 | Rosen | ..................... | G10L 15/22 |
| 9,734,845 B1 * | 8/2017 | Liu | .......................... | G10L 25/78 |
| 2005/0033582 A1 * | 2/2005 | Gadd | ..................... | G06Q 30/02 704/277 |

(Continued)

*Primary Examiner* — Neeraj Sharma
(74) *Attorney, Agent, or Firm* — Ference & Associates LLC

(57) ABSTRACT

One embodiment provides a method, including: receiving, at an information handling device, voice input; determining, using at least one sensor associated with the information handling device, whether the voice input comprises voice input provided proximate to the information handling device; and providing, based on determining that the voice input is provided proximate to the information handling device, output responsive to the voice input. Other aspects are described and claimed.

3 Claims, 3 Drawing Sheets

(56) References Cited

U.S. PATENT DOCUMENTS

| | | | |
|---|---|---|---|
| 2014/0330560 A1* | 11/2014 | Venkatesha | G06F 21/32 704/235 |
| 2015/0228274 A1* | 8/2015 | Leppanen | G10L 15/20 704/243 |
| 2015/0281985 A1* | 10/2015 | Cavallaro | H04W 24/08 455/41.2 |
| 2016/0170710 A1* | 6/2016 | Kim | G06F 3/167 704/275 |
| 2016/0335917 A1* | 11/2016 | Lydecker | G09B 21/008 |
| 2017/0083285 A1* | 3/2017 | Meyers | G10L 15/063 |
| 2017/0110130 A1* | 4/2017 | Sharifi | G06F 21/32 |
| 2017/0242651 A1* | 8/2017 | Lang et al. | H02B 1/00 381/123 |
| 2017/0242653 A1* | 8/2017 | Lang | H04S 7/301 |
| 2017/0265012 A1* | 9/2017 | Tico | H04R 29/005 |
| 2017/0311092 A1* | 10/2017 | Secall et al. | H04R 25/505 |
| 2018/0144748 A1* | 5/2018 | Leong | G10L 15/22 |
| 2018/0234765 A1* | 8/2018 | Torok | H04R 3/12 |
| 2018/0277132 A1* | 9/2018 | LeVoit | G10L 15/02 |
| 2018/0341643 A1* | 11/2018 | Alders | G10L 15/1822 |
| 2019/0199967 A1* | 6/2019 | Tangeland | H04N 7/152 |

\* cited by examiner

US 10,847,163 B2

PROVIDE OUTPUT REPONSIVE TO PROXIMATE USER INPUT

BACKGROUND

Information handling devices ("devices"), for example smart phones, tablet devices, smart speakers, laptop and personal computers, and the like, may be capable of receiving command inputs and providing outputs responsive to the inputs. A common method of providing input to a device is by providing voice input to the device (e.g., to a voice input module embodied in a personal assistant, etc.). Generally, regardless of the source of the voice input (e.g., a proximate human user, another non-human source, etc.), a device may process the received input and provide a responsive output.

BRIEF SUMMARY

In summary, one aspect provides a method, comprising: receiving, at an information handling device, voice input; determining, using at least one sensor associated with the information handling device, whether the voice input comprises voice input provided proximate to the information handling device; and providing, based on determining that the voice input is provided proximate to the information handling device, output responsive to the voice input.

Another aspect provides an information handling device, comprising: at least one sensor; a processor; a memory device that stores instructions executable by the processor to: receive voice input; determine whether the voice input comprises voice input provided proximate to the information handling device; and provide, based on determining that the voice input is provided proximate to the information handling device, output responsive to the voice input.

A further aspect provides a product, comprising: a storage device that stores code, the code being executable by a processor and comprising: code that receives voice input; code that determines whether the voice input comprises voice input provided proximate to the information handling device; and code that provides, based on determining that the voice input is associated with a user proximate to the information handling device; output responsive to the voice input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
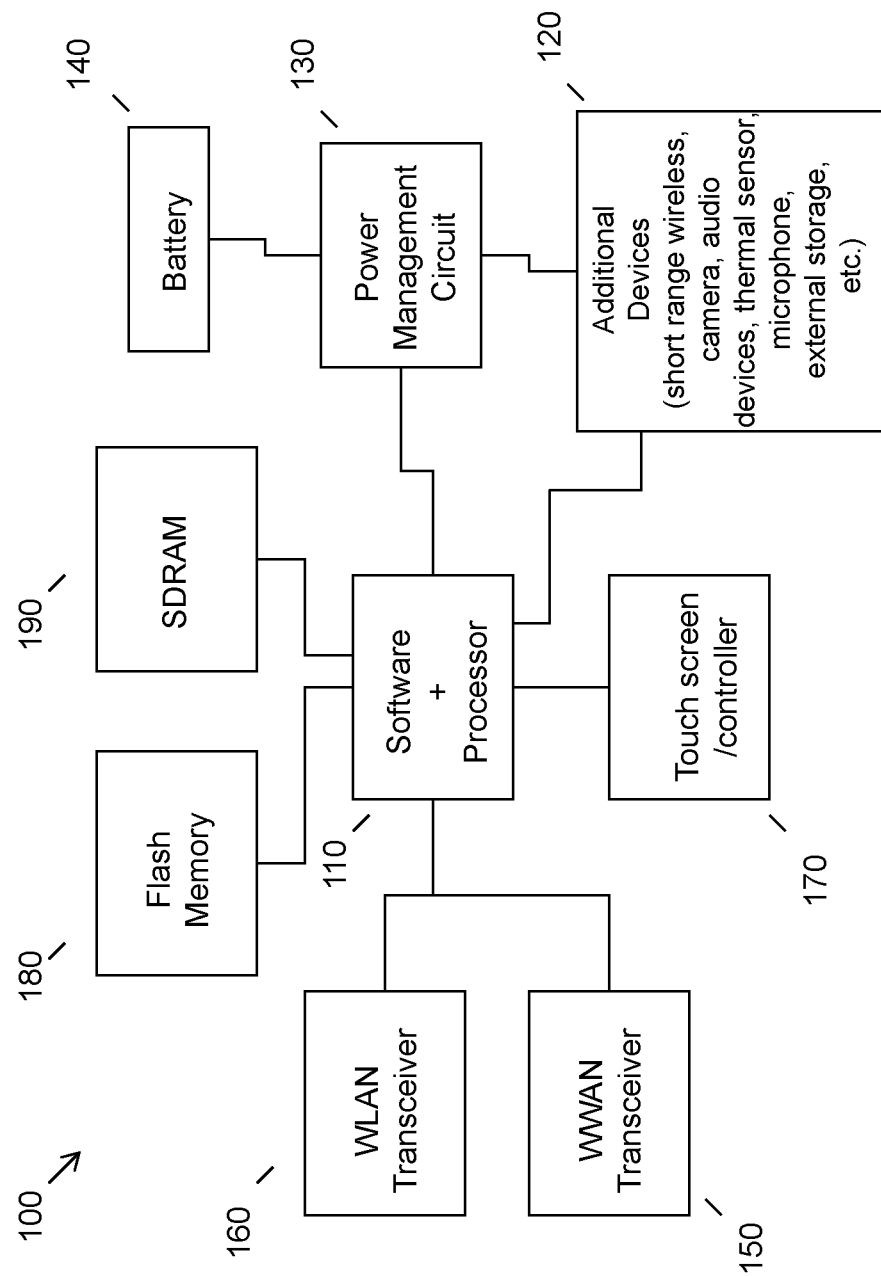
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

Conventionally, in regards to audio input, digital assistants may provide a corresponding output responsive to recognizing a command or query present in the audio input, regardless of the source of the input. More specifically, conventional digital assistants are unable to differentiate between a proximate human source (e.g., a user in the same room as the digital assistant, etc.) and a remote or non-human source (e.g., audible input provided by a television, etc.). For example, a digital assistant disposed in the same room as a television may process and provide output in response to audible input received from a commercial playing on the television (e.g., where the commercial recites a trigger or wake word that activates the digital assistant, etc.). The lack of an ability to differentiate between these types of inputs may lead to a variety of issues. For example, the production of unrequested audible output may be annoying to users in proximity to the digital assistant.

Existing solutions claim to be able to differentiate between these types of sources by distinguishing human vocal chords from electro-mechanical speakers. However, these solutions are largely unproven and are not implemented in major digital assistant technologies.

Accordingly, an embodiment provides a method for providing output responsive to determining that voice input was provided by a proximate human user. In an embodiment, voice input (e.g., voice command input, voice query input, etc.) may be received at a device. An embodiment may then use at least one sensor associated with the device (e.g., a thermal sensor, an audio capture device, an image capture device, etc.) to determine if the voice input is associated with a proximate user (e.g., a human user in the same room as the device, a human user within a predetermined distance of the device, etc.). Responsive to determining that the voice input is associated with a user proximate to the device, an embodiment may process the voice input and/or provide a responsive output. Such a method may enable devices to differentiate between audible input received from human sources and non-human sources and correspondingly ignore input from the latter.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
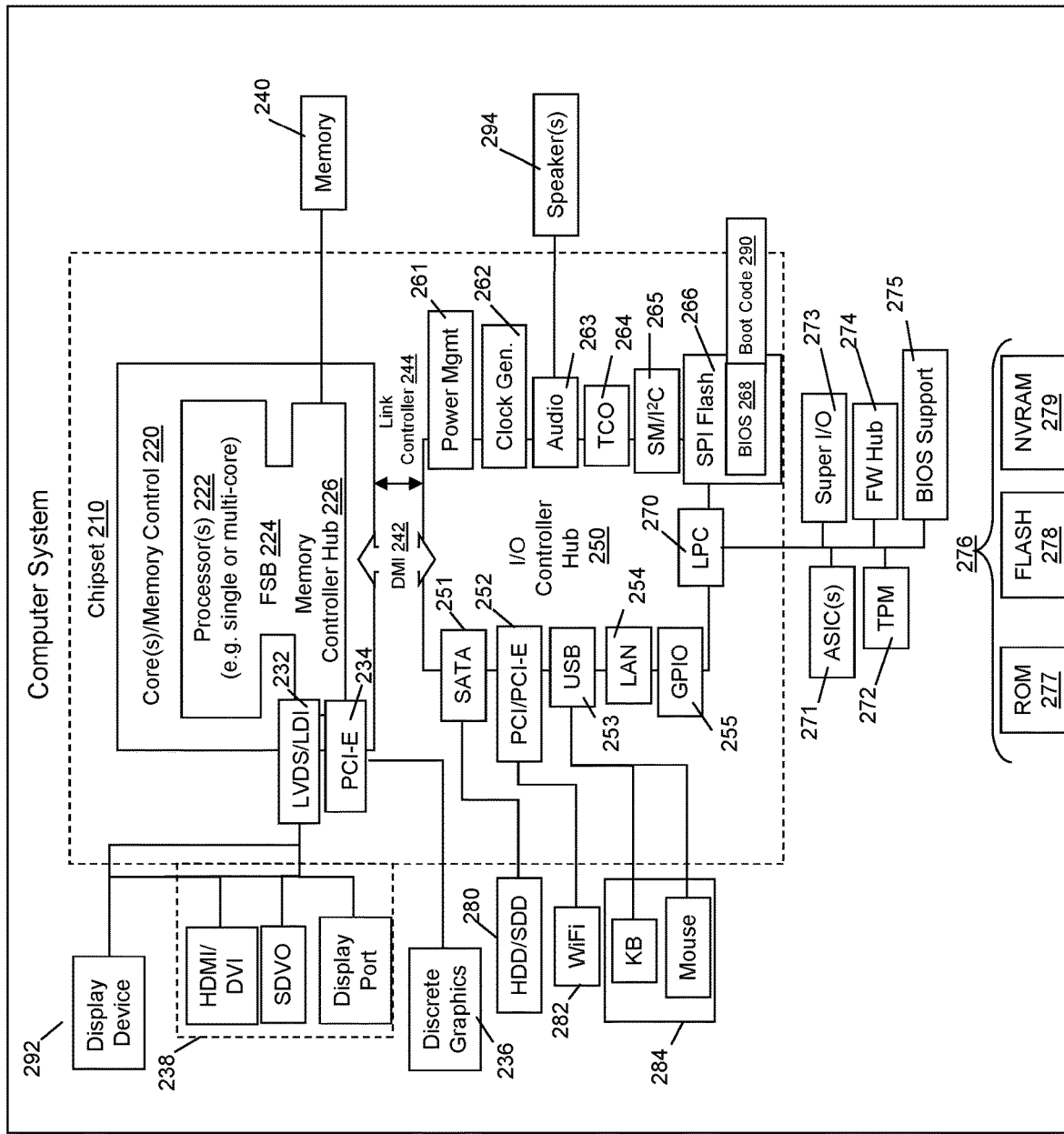
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
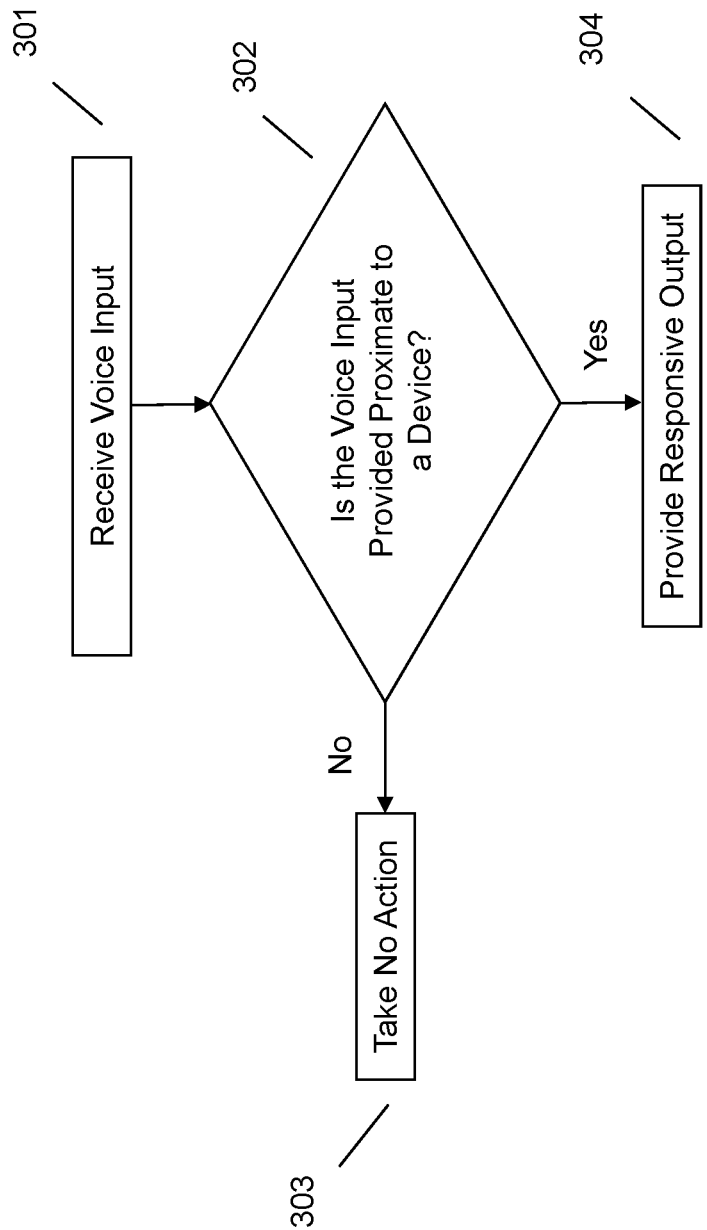
FIG. 3 illustrates an example method of providing output responsive to determining that voice input was provided by a proximate user.

Referring now to FIG. 3, an embodiment may provide output responsive to determining that voice input was provided by a proximate user. At 301, an embodiment may receive voice input from at least one user. The voice input may be any type of input such as a command input, query input, and the like. In an embodiment, the voice input may be received at an input device (e.g., a microphone, a speech capture device, etc.) operatively coupled to a speech recognition device.

In an embodiment, the input device may be an input device integral to the speech recognition device. For example, a smart phone may be disposed with a microphone capable of receiving voice input data. Alternatively, the input device may be disposed on another device and may transmit received voice input data to the speech recognition device. For example, voice input may be received at a smart speaker that may subsequently transmit the voice data to another device (e.g., to a user's smartphone for processing, etc.). Voice input data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speech recognition device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may determine if the voice input is associated with a user proximate to the speech recognition device. In an embodiment, the determination may be made by utilizing at least one of a variety of different sensors such a thermal sensor (e.g., a thermopile sensor, etc.), an image capture device (e.g., a camera, etc.), an audio capture device (e.g., a microphone, etc.), and the like. Data obtained from one or more of these sensors may be used in the determination. In an embodiment, the sensors may be integral to the device or, alternatively, may be disposed on another device and may transmit data (e.g., using a wired or wireless connection, etc.) to the device. The data from the sensors disposed on another device may be communicated from other sources to the device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like. The data attained from the sensors may be used to determine whether the voice input was provided by a user in the vicinity of the device or, alternatively, provided by another source (e.g., a remote source such as a television commercial, etc.).

In an embodiment, the at least one sensor may be a thermal sensor. An embodiment may detect thermal data associated with a proximate user by utilizing the thermal sensor. In this context, thermal data may refer to heat data emitted by a thermal entity (e.g., a proximate human user, etc.). In an embodiment, the thermal data may be detected by at least one thermal sensor associated with a device. The thermal sensor may be a sensor integral to the device. For example, a smart phone may be disposed with a thermal sensor capable of detecting heat signatures of surrounding thermal entities. Alternatively, the thermal sensor may be disposed on another device and may transmit detected thermal data to the device. For example, a smart thermostat in the same room as the speech recognition device may be disposed with a thermal sensor that may detect nearby thermal data and subsequently transmit that data to the speech recognition device. An embodiment may determine that voice input is associated with a proximate user if thermal data associated with the proximate user is detected substantially when, or shortly after (e.g., within a predetermined time threshold such as 1 second, 2 second, etc.), voice input is received by the device. In an embodiment, the thermal sensor may be a 1-pixel thermal sensor comprising a lens positioned in front of the thermal sensor. The lens may help to differentiate different thermal objects in its field of view. For example, if two thermal objects are detected and one of the objects is very hot and the other is not, the very hot object may saturate the 1-pixel sensor and obscure the colder object. Therefore, the lens may help to smooth this out by requiring or mixing the heat sensing across a wider area. Additionally, the lens may help to differentiate between a thermal entity associated with a pet and a thermal entity associated with a person by "forcing" the sensor to "see" at a given height, or across a range of heights.

In an embodiment, the at least one sensor may be an image capture device. An embodiment may detect image data associated with a proximate user by utilizing the image capture device. In this context, image data may refer to still image data (e.g., a photo, etc.) and/or moving image data (e.g., a video, etc.). In an embodiment, detected images may be compared to stored image data (e.g. image data stored in a database, etc.) and/or accessible image data (e.g., image data accessible online, etc.), where the stored and/or accessible image data is associated with images of human users. Based on the comparison, an embodiment may determine whether the detected image data is associated with a human user. For the comparison, an embodiment may utilize any image data it detected substantially when, or shortly before or after, voice input was received. In another embodiment, responsive to receiving voice input, an embodiment may initiate instructions to capture image data, which may then be used for the comparison.

In an embodiment, the at least one sensor may be an audio capture device. An embodiment may detect audio data associated with a proximate user by utilizing the audio capture device. In this context, audio data may refer to various types of voice inputs such as vocal command inputs, vocal query inputs, and the like. In an embodiment, a direction the audio input was provided from may be determined. For example, utilizing known sound localization techniques, an embodiment may be able to identify the direction of the audible input. Using this identified direction, an embodiment may be able to determine whether the audible input was provided by a proximate human user or another, non-human source. For example, if a device knows the location of other proximate devices (e.g., from previous user inputs, by communicating with the other devices, etc.), responsive to receiving audible input an embodiment may be able to identify the direction of the source of the input and determine if that source is associated with the location of one of the other proximate devices. If an embodiment identifies that the audible input derived from a location associated with a proximate device then an embodiment may conclude that the source of the input was the proximate device and not a human user.

Additional methods of determining whether voice input is associated with a user may be utilized. In an embodiment, speaker recognition may be utilized. For example, an embodiment may analyze the voice input to determine characteristics associated with the voice input (e.g., using known voice analysis techniques such as spectrogram analysis, speech parsing, etc.) and attempt to identify a user and/or a voice profile associated with a user by using the determined voice input characteristics. If the speaker is unknown, an embodiment may ignore the voice input. In another embodiment, an embodiment may identify device-associated output such as commercials. For example, an embodiment may receive audio input and determine that the input is associated with a commercial (e.g., by accessing a database of known commercials, using audio identifying technology like Shazam®, etc.). Responsive to identifying that the audio input is associated with a commercial, an embodiment may ignore the input. In yet another embodiment, an embodiment may identify device-associated audio input by recognizing hidden or masked tones in a media stream, such as the signaling included in some ratings tracking systems. In yet another embodiment, speaker diarization techniques and signal processing, such as blind source separation, may also be used to determine whether audible input is associated with a human user or another device. In yet another embodiment, an embodiment may snoop on casted traffic. More particularly, by knowing the audio that is being played by speakers, the system can perform an AEC-like signal processing technique to remove the signal from the microphone stream.

All of the aforementioned methods may be used individually or in combination to determine whether voice input is associated with a user.

Responsive to determining, at 302, that the voice input is associated with a user proximate to the device, an embodiment may provide, at 304, output responsive to the voice input. The output may be audio output, visual output, a combination thereof, or the like. In an embodiment, the audible output may be provided through a speaker, another output device, and the like. In an embodiment, the visual output may be provided through a display screen, another display device, and the like. In an embodiment, the output device may be integral to the speech recognition device or may be located on another device. In the case of the latter, the output device may be connected via a wireless or wired connection to the speech recognition device. For example, a smart phone may provide instructions to provide audible output through an operatively coupled smart speaker. In an embodiment, output may refer to other types of output that do not have an audible or visual effect (e.g., processing output, transaction output, etc.).

An embodiment may utilize a threshold based on the content or context of the audible input query/command. An embodiment may assign confidence scores to all received input and only process and/or provide output responsive to the inputs that are greater than the threshold. In an embodiment, the threshold may be a variable threshold that may change based on the type of output requested to be performed by the input. For example, the threshold level may be higher if the request is to perform some physical action, is related to a financial transaction, is related to personal information, warrants a lengthy response, and the like.

Responsive to determining, at 302, that the voice input is not associated with a user proximate to the device, an embodiment may, at 303, take no action. For example, in an embodiment, the received voice input may be ignored. In another example, an embodiment may receive the voice input but, based on the determination, choose not to process the voice input and/or choose not to provide output responsive to the voice input. In yet another example, an embodiment may provide a clarification query requesting that a user provide a confirmation input to confirm the voice input. If no confirmation input is received within a predetermined time threshold (e.g., 10 seconds, 15 seconds, etc.) an embodiment may ignore the voice input. If confirmation input is received within the predetermined time threshold, then an embodiment may, at 304, provide responsive output.

The various embodiments described herein thus represent a technical improvement to conventional input source identification techniques. Using the techniques described herein, an embodiment may determine whether received audible input is associated with a proximate human user or is associated with a non-human source. If an embodiment determines that the input is associated with a non-human source, then an embodiment may ignore the input and/or provide no output. Such techniques prevent a device from processing and providing output responsive to input not provided by a human user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device, voice input comprising a command;

identifying, using a processor, a direction from which the voice input was received;

determining, by at least accessing a data store comprising known locations for at least one other sound-producing device, whether the direction corresponds to a known location of the at least one other sound-producing device, wherein the determining comprises determining the known location via dynamically communicating with the at least one other sound-producing device;

providing, responsive to determining that the direction corresponds to the known location, a clarification query;

monitoring, subsequent to the providing, for a confirmation input; and providing, responsive to receiving the confirmation input within a predetermined time threshold, output responsive to the command.

2. An information handling device, comprising:

at least one sensor;

a processor;

a memory device that stores instructions executable by the processor to:

receive voice input comprising a command;

identify a direction from which the voice input was received;

determine, and by at least accessing a data store comprising known locations for at least one other sound-producing device, whether the direction corresponds to a known location of the at least one other sound-producing device, wherein the determining comprises determining the known location via dynamically communicating with the at least one other sound-producing device;

provide, responsive to determining that the direction corresponds to the known location, a clarification query;

monitor, subsequent to the providing, for a confirmation input; and provide, responsive to receiving the confirmation input within a predetermined time threshold, output responsive to the command.

3. A product, comprising:

a storage device that stores code, the code being executable by a processor and comprising:

code that receives voice input comprising a command;

code that identifies a direction from which the voice input was received;

code that determines, by at least accessing a data store comprising known locations for at least one other sound-producing device, whether the direction corresponds to a known location of the at least one other sound-producing device; wherein the determining comprises determining the known location via dynamically communicating with the at least one other sound-producing device;

code that provides, responsive to determining that the direction corresponds to the known location, a clarification query;

code that monitors, subsequent to the providing, for a confirmation input; and code that provides, responsive to receiving the confirmation input within a predetermined time threshold, output responsive to the command.

* * * * *